(12) United States Patent
Yu

(10) Patent No.: US 9,047,056 B2
(45) Date of Patent: Jun. 2, 2015

(54) PROTECTIVE CASING HAVING KEYBOARD

(71) Applicant: Zhongshan Innocloud Intellectual Property Services Co., Ltd., Zhongshan (CN)

(72) Inventor: Hai-Yang Yu, Shenzhen (CN)

(73) Assignee: Zhongshan Innocloud Intellectual Property Services Co., Ltd., Zhongshan (CN)

( * ) Notice: Subject to any disclaimer, the term of this patent is extended or adjusted under 35 U.S.C. 154(b) by 211 days.

(21) Appl. No.: 13/851,078

(22) Filed: Mar. 26, 2013

(65) Prior Publication Data

US 2014/0118917 A1    May 1, 2014

(30) Foreign Application Priority Data

Nov. 1, 2012   (CN) .......................... 2012 1 04301988

(51) Int. Cl.
  *G06F 1/16*        (2006.01)
(52) U.S. Cl.
  CPC ............ *G06F 1/1662* (2013.01); *G06F 1/1624* (2013.01); *G06F 1/1669* (2013.01); *G06F 2200/1633* (2013.01)
(58) Field of Classification Search
  CPC combination set(s) only.
  See application file for complete search history.

(56) References Cited

U.S. PATENT DOCUMENTS

| 2006/0104013 A1* | 5/2006 | Sakakibara et al. .......... 361/680 |
| 2010/0277858 A1* | 11/2010 | Zhou ........................ 361/679.17 |
| 2011/0037701 A1* | 2/2011 | Wang ............................. 345/169 |
| 2012/0224316 A1* | 9/2012 | Shulenberger .......... 361/679.09 |
| 2013/0033807 A1* | 2/2013 | Kim ......................... 361/679.01 |
| 2013/0100027 A1* | 4/2013 | Wang et al. ................... 345/168 |
| 2013/0105191 A1* | 5/2013 | Ge et al. ......................... 174/50 |
| 2013/0128465 A1* | 5/2013 | Oh ................................ 361/726 |
| 2013/0201621 A1* | 8/2013 | Song et al. ............... 361/679.27 |
| 2013/0203473 A1* | 8/2013 | Kota .......................... 455/575.8 |
| 2013/0257733 A1* | 10/2013 | Moore et al. ................. 345/168 |
| 2013/0293474 A1* | 11/2013 | Allen et al. ................... 345/168 |

* cited by examiner

*Primary Examiner* — Lisa Lea Edmonds
(74) *Attorney, Agent, or Firm* — Novak Druce Connolly Bove + Quigg LLP

(57) ABSTRACT

A protective casing includes a main body, a keyboard, and two connecting members. The main body includes a support plate having a first surface and a second surface opposite to the first surface, a fixing frame protruding from the second surface of the support plate and defining a receiving space for retaining a tablet computer; and two parallel sidewalls protruding from the first surface of the support plate and each comprising a sliding portion on an inner side thereof. The opposite sidewalls of the fully-functioning keyboard each define a first sliding groove to receive one of the sliding portions. The connecting members are pivotally attached to the sidewalls and each defines a second sliding groove to receive one of the sliding portions. The sliding portions are slidable in the first and second sliding grooves.

9 Claims, 6 Drawing Sheets

PROTECTIVE CASING HAVING KEYBOARD

BACKGROUND

1. Technical Field

The present disclosure relates to protective casings for encasing a tablet computer, and particularly to a protective casing having a keyboard.

2. Description of Related Art

Tablet devices using a touch screen, such as Personal Digital Assistants and smart phones, are popular. A protective casing encasing the tablet computer is available to protect the tablet device. For longer documents and other applications, a traditional physical keyboard is useful. Thus, there is a need to provide a protective casing integrating a keyboard to protect the tablet device and improve the efficiency of inputting information.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure are described with reference to the accompanying drawings.

Figure 1:
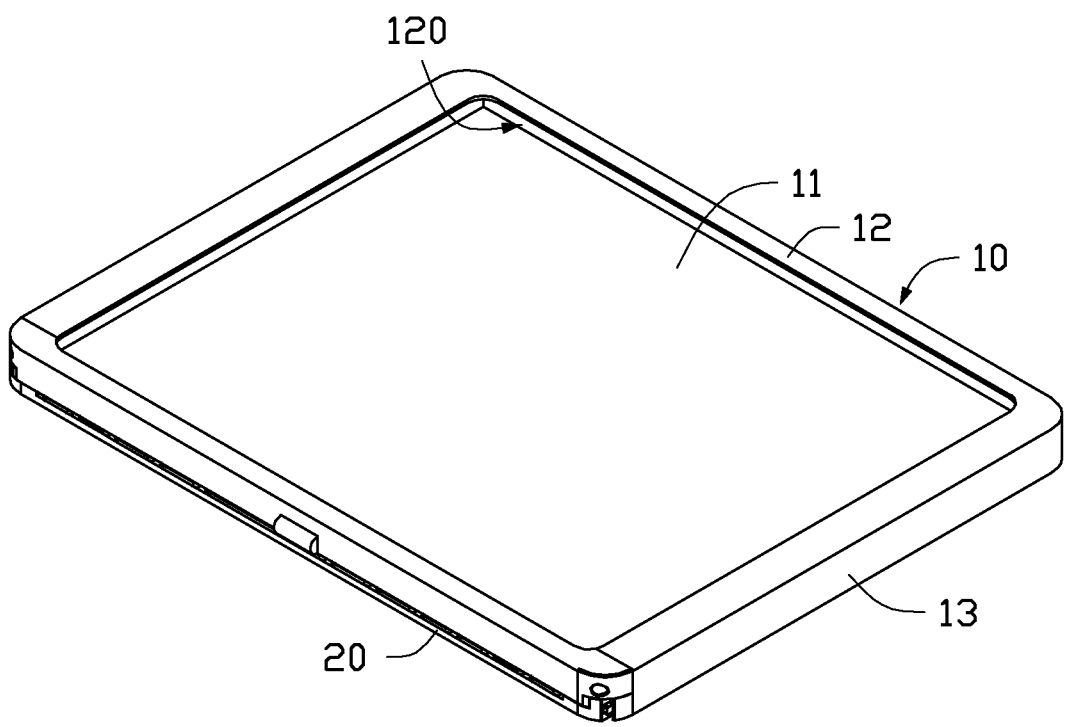
FIG. 1 is an isometric view of a protective casing having keyboard according to an exemplary embodiment.
Figure 2:
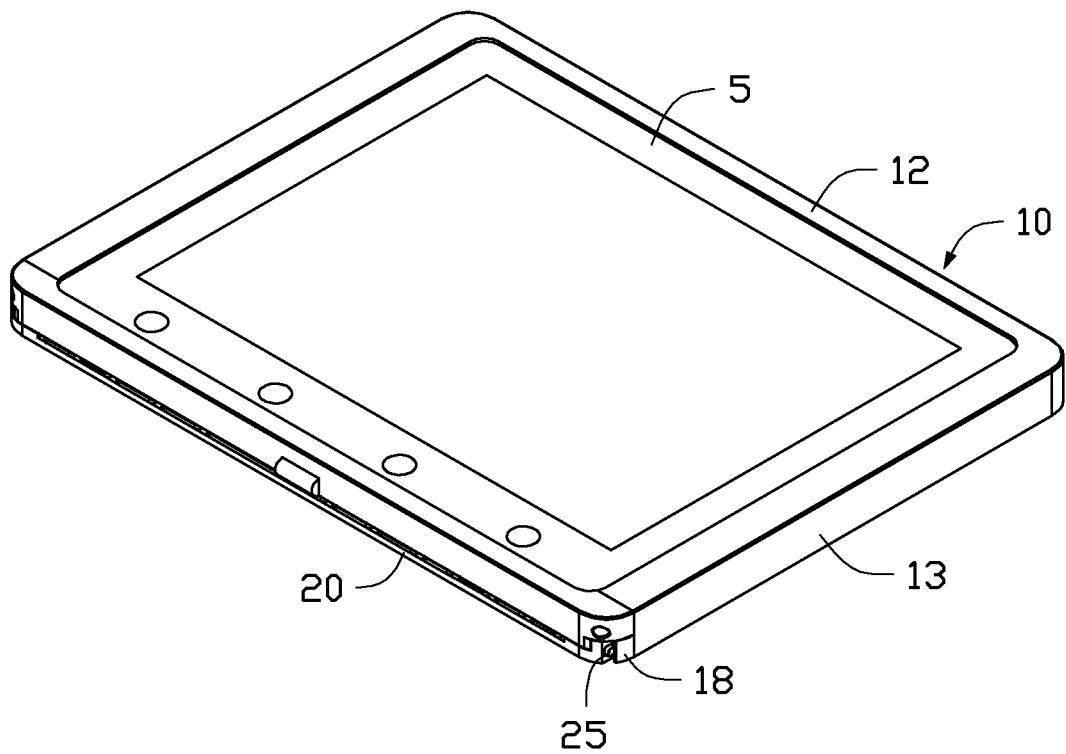
FIG. 2 is an exploded, isometric view of the protective casing of FIG. 1.

Referring to FIGS. 1-2, a protective casing 1 according to an exemplary embodiment is illustrated. The protective casing 1 includes a main body 10 for retaining a tablet computer 5 (see FIG. 4) therein, a keyboard 20, and two connecting members 30 movably connecting the keyboard 20 to the housing 10.

The main body 10 includes a rectangular support plate 11, a fixing frame 12, a first sidewall 13, a second sidewall 14, a third sidewall, two sliding portions 17, and two tabs 18. The support plate 11 includes a first surface 110 and an opposite second surface 112. The fixing frame 12 protrudes substantially perpendicularly from the second surface 112 of the support plate 11. The fixing frame 12 includes a first elongated portion 121, a second elongated portion 122, a third elongated portion 123, and a fourth elongated portion 124 which cooperatively define a receiving space 120 therebetween for retaining the tablet computer 5. The first elongated portion 121, the second elongated portion 122, the third elongated portion 123, and the fourth elongated portion 124 each include a bent portion 125 for preventing the tablet computer 5 from moving out of the receiving space 120.

In the embodiment, the fixing frame 12 further includes two fasteners 126. The fasteners 126 extend through the fourth elongated portion 124 and can be screwed into the first elongated portion 121 and the third elongated portion 123 for fixing the fourth elongated portion 124 to the first elongated portion 121 and the third elongated portion 123. The fourth elongated portion 124 and the fasteners 126 can be detached from the first elongated portion 121 and the third elongated portion 123, such that the tablet computer 5 can be removed from the receiving space 120.

In another embodiment, the first elongated portion 121, the second elongated portion 122, the third elongated portion 123, and the fourth elongated portion 124 may be integrally formed and made of resilient material and can thus be elastically deformed to allow the tablet computer 5 to be removed or placed into the receiving space 120.

Figure 3:
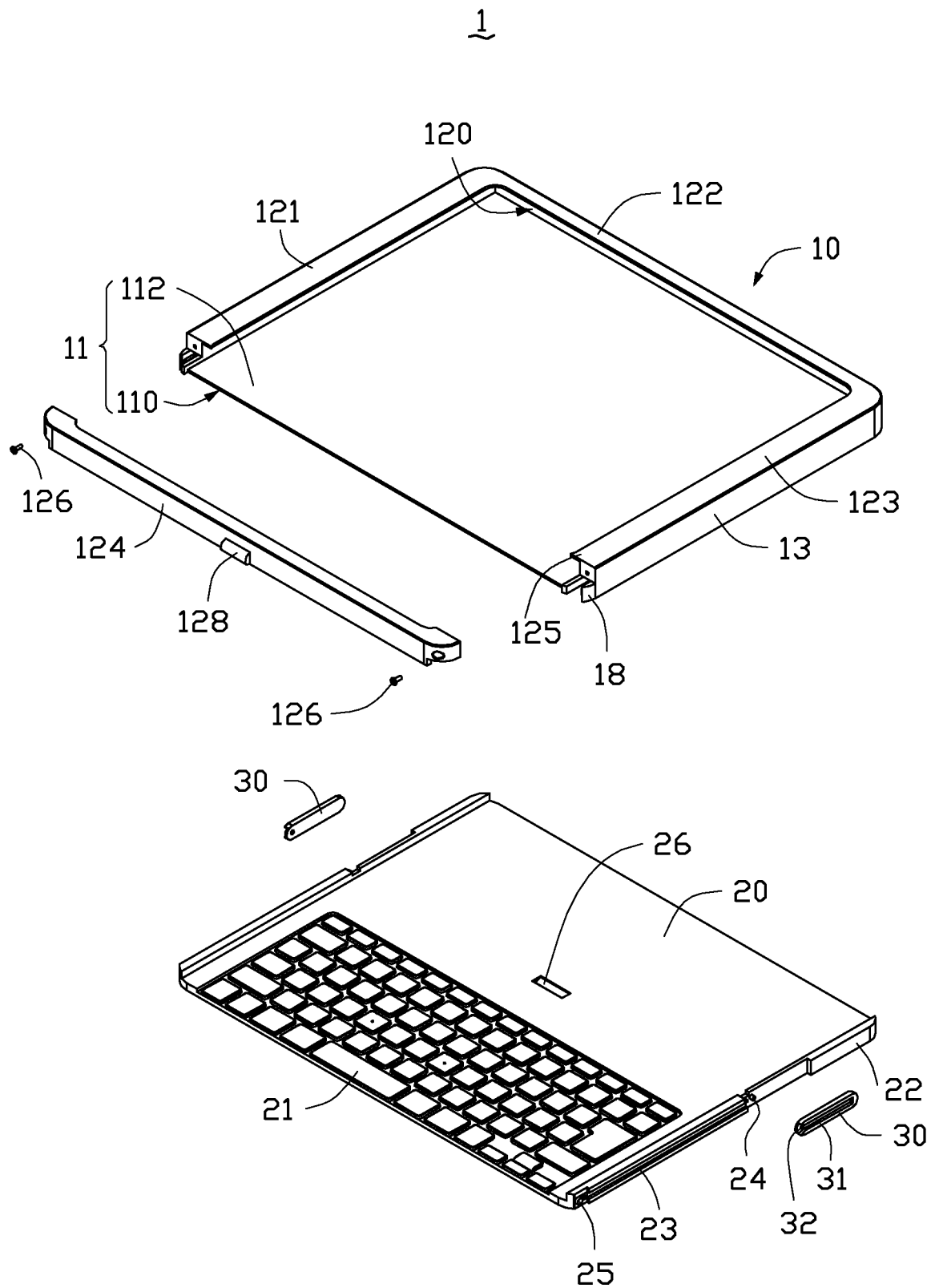
FIG. 3 is an isometric view of a main body of the protective casing viewed from a reverse direction.

Referring also to FIG. 3, the first sidewall 13, the second sidewall 14, and the third sidewall 15 protrude from the first surface 110 of the support plate 11. The third sidewall 15 is substantially perpendicular to the first sidewall 13 and the second sidewall 14. The first sidewall 13, the second sidewall 14, and the third sidewall 15, and the support plate 11 cooperatively define a recess 16 therebetween. As shown in FIG. 2, the keyboard 20 can be entirely received in the recess 16 and in that situation the keys 21 are entirely inserted into the main body 10. The sliding portions 17 are formed on an inner side of the first sidewall 13 and the second sidewall 14. The tabs 18 extend slightly inwardly from the first sidewall 13 and the second sidewall 14 and can be elastically deformed outwardly for allowing the keyboard 20 to be placed into the receiving space 16.

The fully-functioning keyboard 20 includes a number of keys 21 and two opposite sidewalls 22. The keyboard 20 is wirelessly or connected by wires to the tablet computer 5. The sidewalls 22 each define a first sliding groove 23 for receiving the sliding portion 17, and the keyboard 20 further comprises a pivot 24 and a protrusion 25 protruding from the sidewall 22. The sliding portion 17 is slidable in the first sliding groove 23. The pivot 24 and the protrusion 25 are located at opposite ends of the sliding groove 23.

The connecting member 30 defines a second sliding groove 31 for receiving the sliding portion 17 and a pivot hole 32 for the pivot 24 to extend therethrough. The sliding portion 17 is slidable in the second sliding groove 31. When the main body 10 is substantially coplanar with the keyboard 20, the second sliding groove 31 is substantially aligned with the first sliding groove 23, and the sliding portion 17 can thus slide between the first sliding groove 23 and the second sliding groove 31. When the sliding portions 17 slide into the second sliding grooves 31, the main body 10 and the connecting member 30 can be rotated with respect to the keyboard 20, about an axis of the pivot 24.

Figure 4:
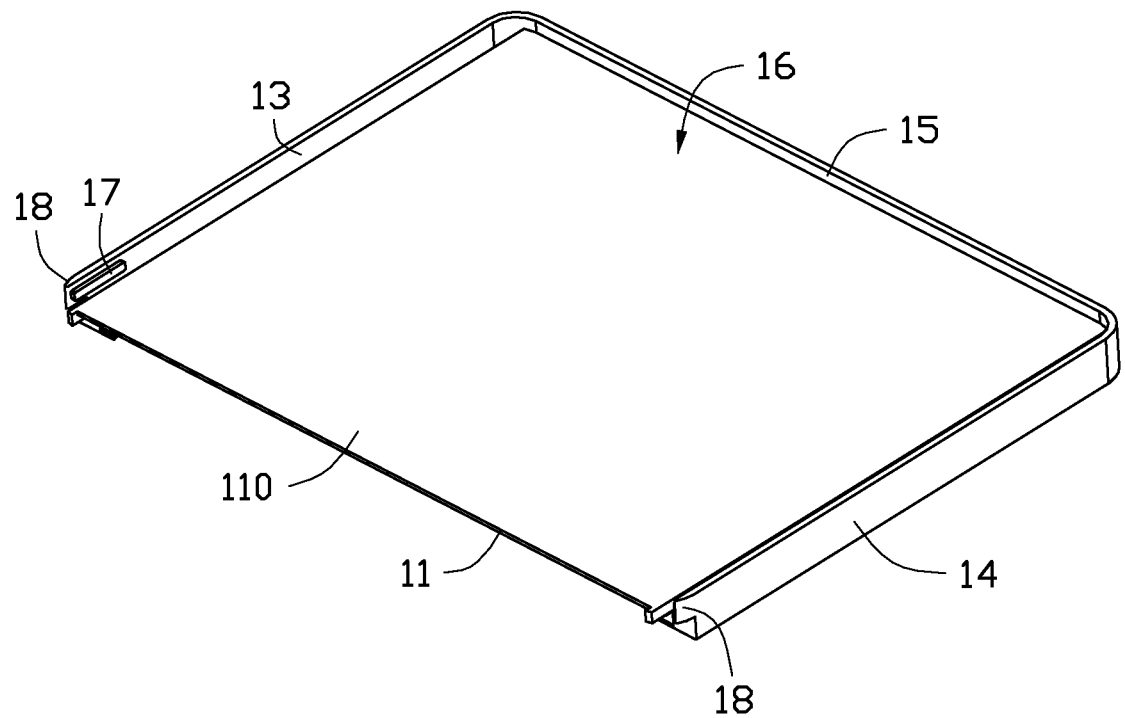
FIG. 4 an isometric view of a tablet computer accommodated in the protective casing of FIG. 1.

Referring to FIG. 4, the fourth elongated portion 124 and the fasteners 126 are firstly removed from the first elongated portion 121 and the third elongated portion 123, and the tablet computer 5 is placed into receiving space 120 of the fixing frame 12. The tabs 18 abut the protrusions 25 and prevent the keyboard 20 from disengaging from the main body 10.

In another embodiment, the fourth elongated portion 124 may be made of resilient material, such as rubber. The fourth elongated portion 124 can be elastically deformed to allow insertion or removal of the tablet computer 5 without detaching the fourth elongated portion 124 from the first elongated portion 121 and the third elongated portion 123.

Figure 5:
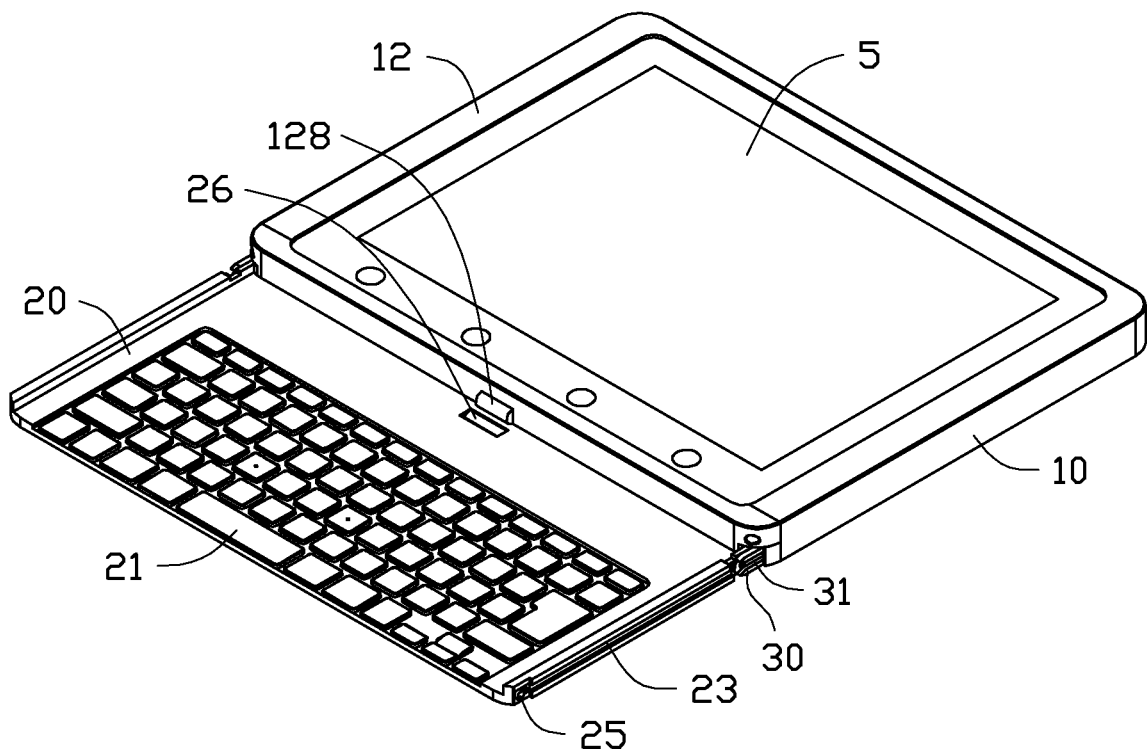
FIG. 5 is similar to FIG. 4, but showing the exposed keys of keyboard.

Referring to FIG. 5, when the keyboard 20 is pulled away from the main body 10, the tabs 18 of the main body 10 are elastically deformed to allow the tabs 18 of the keyboard 20 to pass therethrough. The sliding portions 17 slide along the first sliding grooves 23 until they move into the second sliding grooves 31. Thus, the keys 21 are exposed and ready for use.

Figure 6:
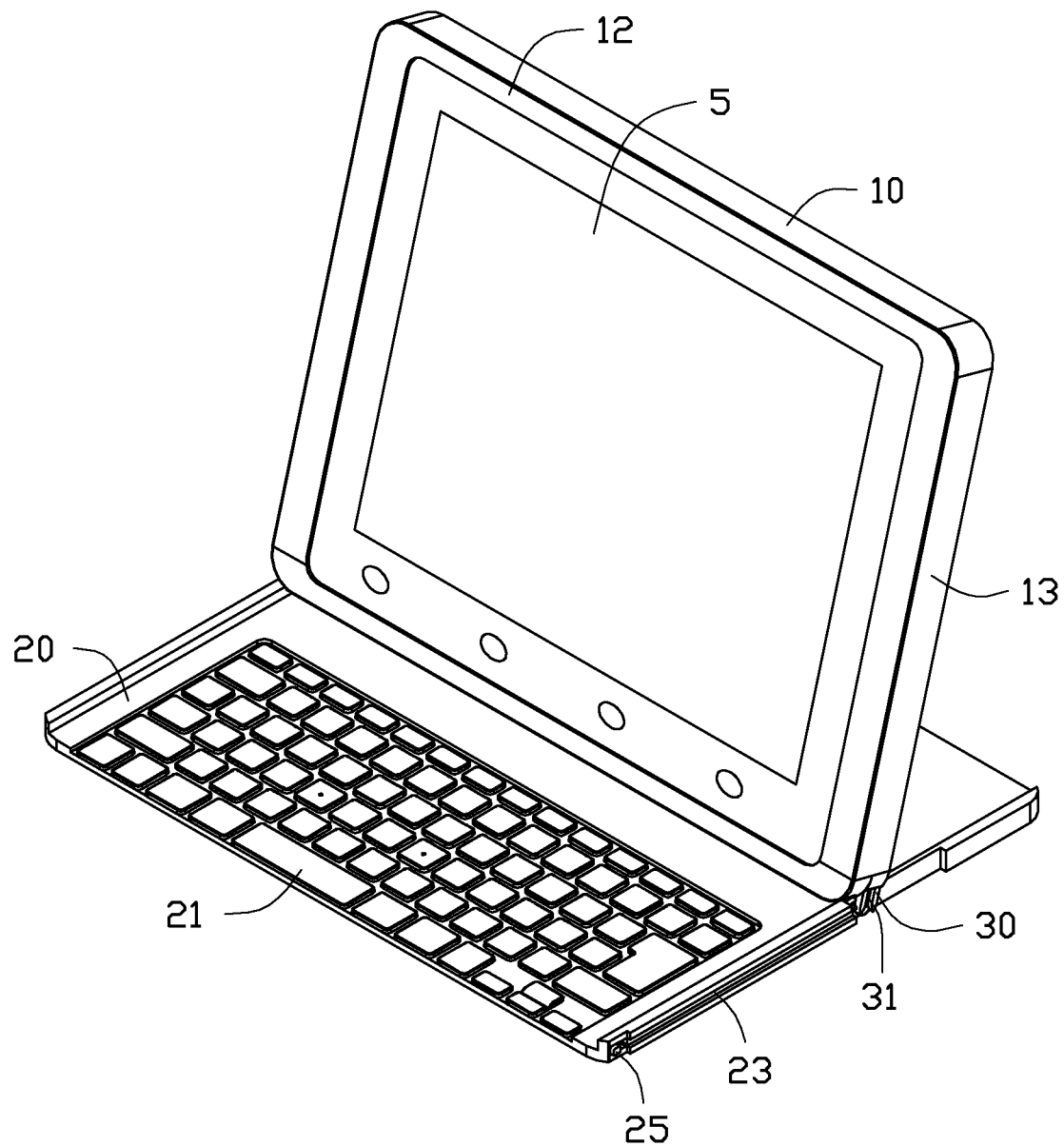
FIG. 6 is similar to FIG. 4, but showing the keys of keyboard and the tablet computer tilted with respect to the keyboard.

Referring to FIG. 6, when the sliding portions 17 move into the second sliding grooves 31, the main body 10 and the tablet computer 5 can be rotated to achieve an optimum viewing angle.

In the embodiment, the fixing frame 12 further includes a positioning block 128 protruding from the fourth elongated portion 124, and the keyboard 20 further defines a positioning hole 26 to receive the positioning block 128. When the tablet computer 5 is rotated to the optimum viewing angle, the positioning block 128 lockingly engages with the positioning hole 26 to hold the tablet computer 5 steadily at that angle on the keyboard 20.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A protective casing comprising:
   a main body comprising:
      a support plate comprising a first surface and a second surface opposite to the first surface;
      a fixing frame protruding from the second surface of the support plate and defining a receiving space for retaining a tablet computer; and
      two parallel sidewalls protruding from the first surface of the support plate and each comprising a sliding portion on an inner side thereof;
   a keyboard comprising a plurality of keys and opposite sidewalls each defining a first sliding groove to receive the corresponding sliding portion; and
   two connecting members pivotally attached to the sidewalls and each defining a second sliding groove to receive one of the sliding portions;
   wherein the sliding portions are slidable in the first sliding grooves and the second sliding grooves, when the sliding portions slide into the second sliding groove, the plurality of keys of the keyboard are exposed, and the main body is rotatable with respect to the keyboard.

2. The protective casing as described in claim 1, wherein the sliding portions are slidable in the first sliding grooves and slidable to a position where the plurality of keys of the keyboard are entirely inserted into the main body.

3. The protective casing as described in claim 1, wherein the fixing frame comprises a first elongated portion, a second elongated portion, a third elongated portion, and a fourth elongated portion which cooperatively define the receiving space.

4. The protective casing as described in claim 3, wherein the first elongated portion, the second elongated portion, the third elongated portion, and the fourth elongated portion each comprises a bent portion for preventing the tablet computer from moving out of the receiving space.

5. The protective casing as described in claim 3, wherein the fixing frame further comprises at least two fasteners extending through the fourth elongated portion and screwed into the first elongated portion and the third elongated portion for fixing the fourth elongated portion to the first elongated portion and the third elongated portion.

6. The protective casing as described in claim 3, wherein the fourth elongated portion is made of resilient material and is elastically deformable to allow the tablet computer to be placed into the receiving space.

7. The protective casing as described in claim 3, wherein the first elongated portion, the second elongated portion, the third elongated portion, and the fourth elongated portion are integrally formed by resilient material and thus elastically deformable to allow the tablet computer to be placed into the receiving space.

8. The protective casing as described in claim 3, wherein the fixing frame further comprises a positioning block protruding from the fourth elongated portion, the keyboard further defines a positioning hole to receive the positioning block, and when the tablet computer is rotated to a predetermined orientation, the positioning block lockingly engages with the positioning hole to hold the tablet computer steadily on the keyboard.

9. The protective casing as described in claim 1, wherein the main body comprises at least one tab extending slightly inwardly from the sidewalls, and the keyboard comprises at least one protrusion protruding from the sidewalls for abutting against the at least one tab, thereby preventing the keyboard from disengaging from the main body.

\* \* \* \* \*